May 5, 1964 J. BOCHAN 3,131,797
SPEED RESPONSIVE CLUTCH WITH LOCKING MEANS
Filed Sept. 22, 1961 3 Sheets-Sheet 1

INVENTOR.
JOHN BOCHAN
BY *Derek P Lawrence*
HIS ATTORNEY

May 5, 1964
J. BOCHAN
3,131,797
SPEED RESPONSIVE CLUTCH WITH LOCKING MEANS
Filed Sept. 22, 1961
3 Sheets-Sheet 2
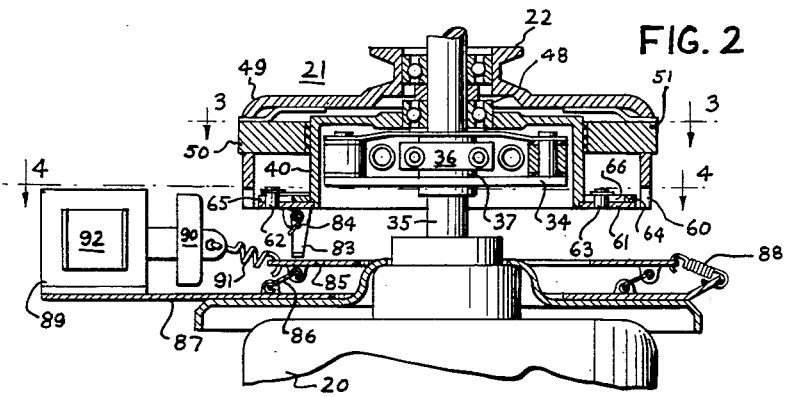
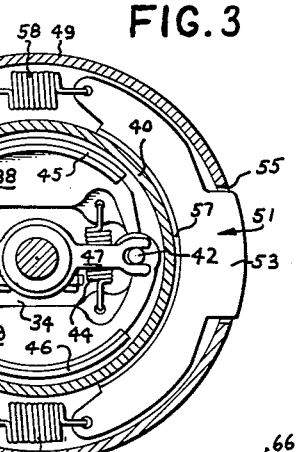
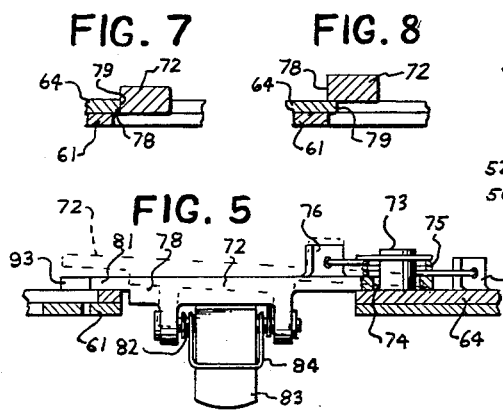
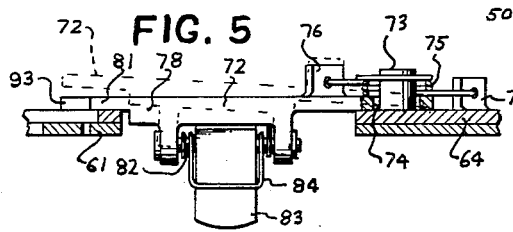
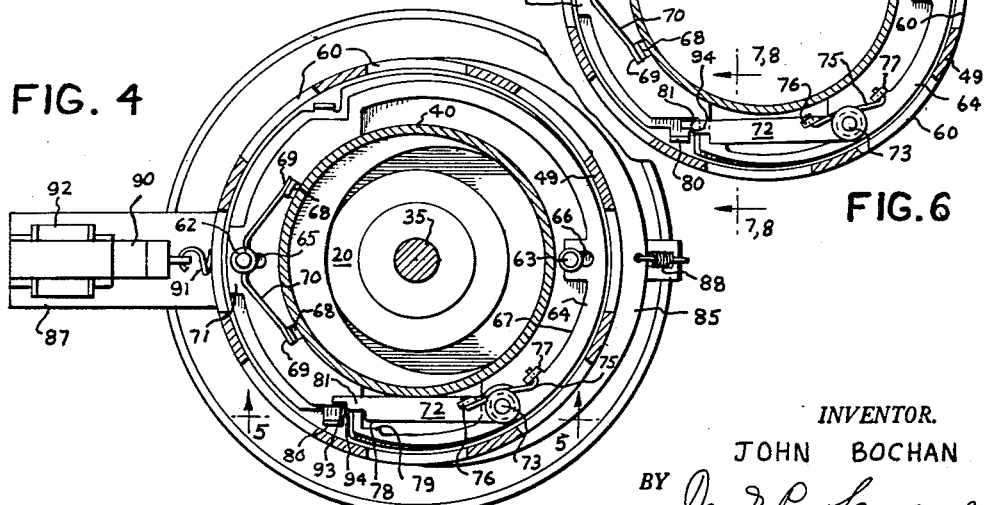
INVENTOR.
JOHN BOCHAN
BY *Derek P. Lawrence*
HIS ATTORNEY

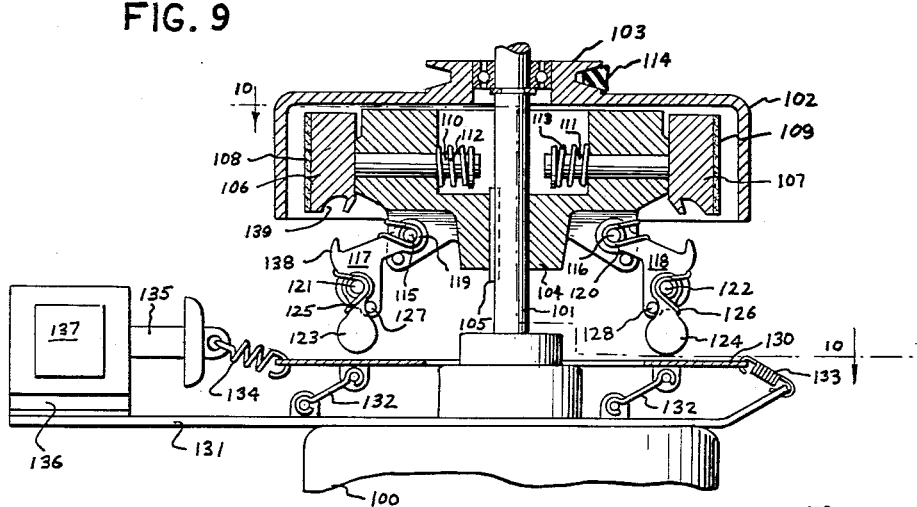
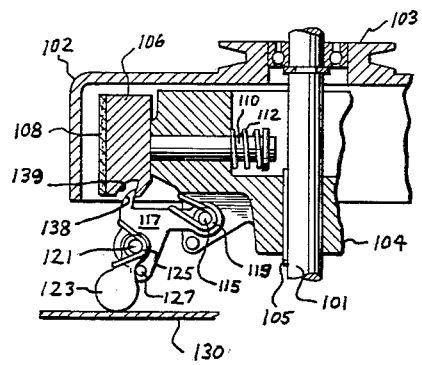
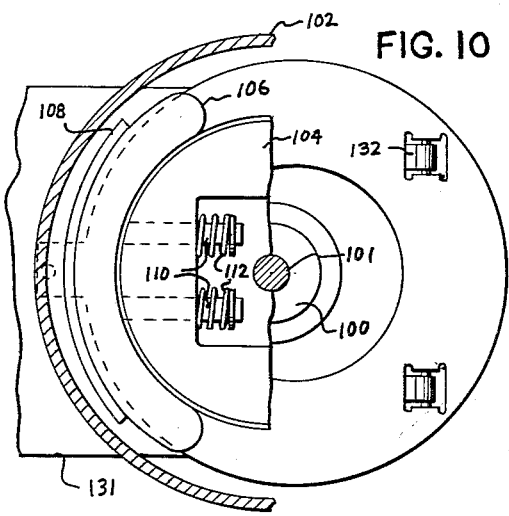
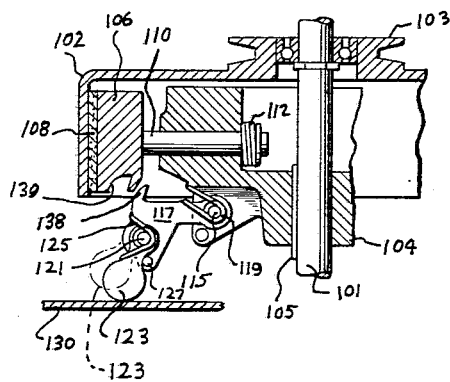

United States Patent Office 3,131,797
Patented May 5, 1964

3,131,797
SPEED RESPONSIVE CLUTCH WITH
LOCKING MEANS
John Bochan, Louisville, Ky., assignor to General Electric Company, a corporation of New York
Filed Sept. 22, 1961, Ser. No. 139,954
13 Claims. (Cl. 192—103)

This invention relates to clutches, and more particularly to a centrifugal type clutch wherein connection of driving and driven members may be effected by speed responsive means as the driving means accelerates to full speed from a standstill.

Clutches of the type wherein connection of the driving and driven members is effected by speed responsive means are quite common. In such clutches, the driving means carries, in some suitable way, a speed responsive device which, as it comes up to speed, acts to connect the driving and driven members together so that they thereafter rotate as a unit. One highly desirable feature in such clutches, where the source of power for the driving member is also used to effect other purposes, is that the engagement of the driven member by the driving member be selectable by the operator, or by a suitable control arrangement. In other words there should be some suitable means of preventing the speed responsive means from connecting the driving and driven members.

It is consequently an object of my invention to provide a new and improved centrifugal type clutch which incorporates an improved arrangement for permitting selection of whether the driving and driven means are to be coupled together by the speed responsive means.

A further more specific object of my invention is to provide a clutch of the type mentioned immediately hereabove wherein the control as to the connection of the driving and driven members is automatically removed as speed increases thereby to preclude damage to the parts by a tardy selection while there is high speed rotation of the driving means relative to the driven means.

In carrying out my invention in one form thereof, I provide a clutch with co-axial rotatable driving and driven means wherein the driving means includes suitable speed responsive means. At a predetermined speed, the speed responsive means moves, in response to the centrifugal force thereon, from an inoperative position to an operative position in which it connects the driving and driven means. In order to cause this action to be selectively provided, the driving means also includes a locking assembly in which a detent, biased to a first position, may be moved to a second position in which it prevents movement of the speed responsive means to its operative position. The detent is movable by means of a follower member which is secured to the detent, and preferably the follower member is biased to a first position relative to the detent, moving to a second position at a predetermined speed.

Suitable camming means are provided so as to be movable into engagement with the follower member; where the follower member is movable relative to the detent, this engagement may occur only when the follower member is in its first position relative to the detent. The design of the follower member and the detent is such that, when the speed responsive means is in its inoperative position and the follower member is engaged by the camming means, the detent moves to its second position thereby preventing connection of the driving and driven means by the speed responsive means. The parts are further suitably designed so that the detent is kept in its second position by centrifugal force upon rotation of the driving means. Thus, as long as there is rotation, the selected situation, that is, an operative or inoperative relationship of the speed responsive means to the driving and driven means will be obtained.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings.

In the drawings:

FIGURE 2 is a fragmentary side elevational view showing a first embodiment of the improved clutch of my invention (as used in the machine of FIGURE 1), the mechanism being shown in section to illustrate details;

FIGURE 3 is a sectional view taken on line 3—3 of FIGURE 2;

FIGURE 4 is a sectional view taken on line 4—4 of FIGURE 2;

FIGURE 5 is a sectional view along line 5—5 of FIGURE 4;

FIGURE 6 is a fragmentary view similar to FIGURE 5 illustrating the movement of one of the parts of the clutch;

FIGURE 7 is a sectional view along line 7—7 of FIGURE 6 showing the parts in a first relationship;

FIGURE 8 is a sectional view along line 8—8 of FIGURE 6 showing the parts in a second relationship;

FIGURE 9 is a side elevational view showing a second embodiment of my improved clutch;

FIGURE 10 is a sectional view taken on line 10—10 of FIGURE 9;

FIGURE 11 is a fragmentary side elevational view similar to FIGURE 9 showing a different relative positioning of the parts of the clutch; and FIGURE 12 is a view similar to FIGURE 11 showing another relative position of the parts of the clutch.

Figure 1:
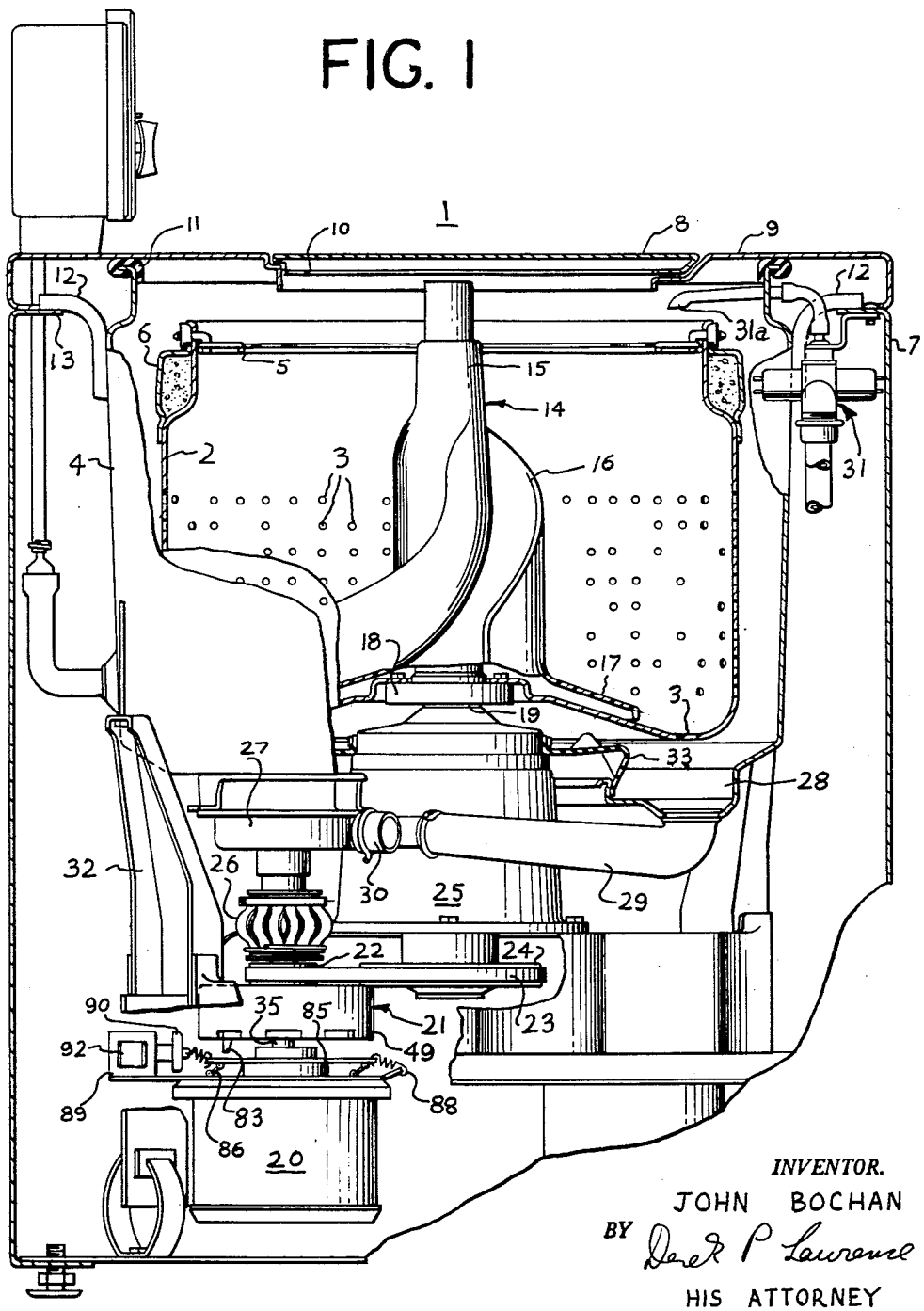
FIGURE 1 is a side elevational view of a typical machine, in this case a clothes washing machine, including a two speed clutch formed in accordance with my invention, the view being partially broken away and partially in section to show details.

Referring now to FIGURE 1, I have shown therein, as a typical machine in which my invention may profitably be used, an agitator type clothes washer 1. Washing machine 1 has a conventional basket or clothes receiving receptacle 2 provided over its side and bottom walls with perforations 3 and disposed within an imperforate outer tub or casing 4, the basket 2 and casing 4 forming together container means for containing liquid and clothes to be washed: the liquid retaining function is performed by the imperforate tub 4 while the clothes retaining function is provided by the perforated basket 2. Basket 2 may be provided with a suitable clothes retaining member 5 for preventing clothes from being floated over the top of the basket and with a balance ring 6 to help steady the basket when it is rotated at high speed within the tub 4.

Tub 4 is rigidly mounted within an appearance cabinet 7 which is arranged so as to substantially enclose all the washing parts of the machine. The cabinet 7 includes a cover 8 hingedly mounted in its top portion 9 for providing access through an opening 10 to the basket 2. As shown, a gasket 11 may be provided so as to form a seal between the top of the cabinet and the tub thereby to prevent escape of moisture and moist air into the cabinet around the tub. The rigid mounting of tub 4 within cabinet 7 may be effected by any suitable means; as a typical example of one such means I have provided strap members 12 each of which is secured at one end to an inturned flange 13 of the cabinet and at its other end to the outside of tub 4. At the center of basket 2 there is positioned a vertical axis agitator, generally indicated by the numeral 14, which includes a center post 15 and a plurality of curved water circulating vanes 16 joined at their lower ends by an outwardly flared skirt 17. The agitator 14 represents a means for causing appropriate circulation of liquid within the tub 4 and this in turn causes flexing of the clothes contained in basket 2 so that a washing action is performed on them.

Both the clothes basket 2 and the agitator 14 are rotatably mounted. The basket is mounted on a flange 18 on a rotatable hub 19, and the agitator 14 is mounted on a shaft (not shown) which extends upwardly through the hub 19, up through the center post 15, and is secured to the agitator so as to drive it. During a typical cycle of operation of machine 1, water is introduced into the tub 4 and basket 2, and the agitator 14 is then oscillated back and forth on its axis, that is, in a horizontal plane within the basket, to wash the clothes therein. Then, after a predetermined period of this washing action, basket 2 is rotated at high speed to extract centrifugally the washing liquid from the clothes and discharge it to drain. Following this extraction operation, a supply of clean liquid is introduced into the basket for rinsing the clothes and the agitator is again oscillated. Finally the basket is once more rotated at high speed to extract the rinse water.

The basket 2 and agitator 14 may be driven through any suitable means as the specific transmission means is not a feature of the present invention. By way of example, I have shown them as driven from a reversible motor 20 which is provided with only a single set of run windings and therefore always rotates at substantially the same rate of speed when energized; in the conventional manner, the relative polarity of its starting and run windings may be reversed so as to cause the rotation of the motor to be reversed.

In order to obtain two different speeds of rotation for the agitator 14 and the basket 2, there is connected to the drive motor a clutch mechanism 21. Mechanism 21 includes an output pulley 22 and, depending upon the selection of the operator, the mechanism is effective to drive pulley 22 at either the speed of the motor 20 or at a predetermined lower speed. In other words, the mechanism is effective to provide a direct drive between the motor 20 and the output pulley 22 or alternatively effective to produce a reduced speed drive of the pulley 22. A part of my invention concept lies in the means to achieve this goal and is described in detail hereinafter.

The output pulley 22 of the two speed clutch is connected by means of a belt 23 to the input pulley 24 of a transmission assembly 25. Transmission 25 is so arranged that it supports and drives both the agitator drive shaft and the basket mounting hub 19. When pulley 24 is rotated in one direction by the output pulley 22 of the clutch 21, the transmission causes the agitator 14 to oscillate within the basket 2. Conversely, when the pulley 24 is driven in the opposite direction, the transmission drives the wash basket 2 and the agitator 14 together at high speed for centrifugal extraction. While there are many suitable structures which may be used for transmission 25, reference is made to Patent 2,844,225, issued July 22, 1958 to James R. Hubbard et al., and assigned to the present assignee; that patent discloses in detail a structure suitable for the purpose.

Thus, the operation carried out, that is, agitation or centrifugal extraction, is controlled by the direction of rotation of the drive motor, agitation occurring when the motor turns in one direction and centrifugal extraction occurring when it turns in the other direction. Whether agitation or centrifugal extraction will be high speed or low speed depends upon the action of the clutch 21. If clutch 21 provides a direct drive between motor 20 and pulley 22, high speed agitation and centrifugal extraction are effected, but if the mechanism provides a reduced speed drive, a lower speed agitation and centrifugal extraction are effected.

Motor 20 also provides a direct drive through a flexible coupling 26 to a pump structure, generally indicated at 27. During agitation, because of the direction of pump rotation, the pump is without effect, tending to pump toward an opening 28 in the bottom of tub 4 through a conduit 29. During reverse motor rotation, the pump draws liquid from the tub through the conduit 29 and discharges this liquid into a conduit 30 leading to a suitable drain line.

Completing briefly the description of machine 1, it will be understood that suitable water inlet means generally indicated by the numeral 31 may be provided so as to discharge water into basket 2 and tub 4 through a conduit 31a at appropriate times. It will also be understood that, to isolate the large forces created during the spinning of water out of the clothes, the basket 2 may be suspended within the tub 4 by any suitable suspension means. A suitable arrangement for this purpose is fully described and claimed in Patent 2,987,189, issued to John M. Evjen on June 6, 1961, and assigned to General Electric Company, assignee of the present invention. A portion of this suspension system is shown by the numeral 32 in the machine 1. In order to accommodate the movement which occurs between the basket 2 and the tub 4 as a result of the resilient suspension in the basket by system 32, the tub 4 is joined to the upper part of transmission 25 by a suitable flexible boot member 33. Boot 33 may be of any suitable configuration, many of which are known in the art, so as to permit relative motion of the parts to which it is joined without leakage therebetween.

Referring now to FIGURES 2 through 8, there is shown therein the construction and arrangement of the two speed clutch 21 which forms a first embodiment of my invention. As best shown in FIGURE 2, clutch 21 includes a clutch carrier plate 34 attached to drive shaft 35 of motor 20 for rotation therewith. Carrier plate 34, which comprises a generally horizontally extending oblong member (see also FIGURE 3), may be secured to shaft 35 in any suitable manner but is shown specifically in FIGURE 2 as being secured to the shaft by means of a clamp 36. Specifically, carrier plate 34 is provided with an upwardly extending hub 37, and the clamp 36 clamps hub 37 securely to the shaft 35.

Carrier plate 34 has mounted on it a pair of speed responsive centrifugally operated clutch shoes 39 (FIGURE 3) which are adapted to clutch the carrier plate 34 to an independently rotatable drum member 40 journaled on shaft 35. As shown in FIGURE 3, the clutch shoes 38 and 39 for driving drum 40 are mounted respectively on the carrier plate 34 by means of mounting pins 41 and 42, and they are biased inwardly toward each other by means of a pair of tension springs 43 and 44 connected between them. Specifically, tension springs 43 and 44 hold the shoes 38 and 39 in the illustrated position when plate 34 is stationary so that the friction pads 45 and 46 provided on their outer surfaces do not engage the drum 40. Springs 43 and 44 prevent clutch shoes 38 and 39 from clutching the input shaft to the drum 40. It will be noted incidentally that the clutch shoes 38 and 39 are positively held on the respective pivot pins 41 and 42 by means of retainer member 47 which is mounted on the shaft 35 and which includes forked end portions fitted around the pivot pins and over the clutch shoes.

When carrier plate 34 is rotated by shaft 35, at that time the clutch shoes 38 and 39 tend to pivot outwardly on the pins 41 and 42 due to the centrifugal force created by their rotation. This tendency of the shoes to pivot outwardly is restrained by the springs 43 and 44 until such time as the centrifugal force becomes greater than the holding force of the springs. Then, however, the clutch shoes do pivot outwardly so their friction surfaces 45 and 46 engage the drum 40.

Drum 40, as shown in FIGURE 2, is journaled on the shaft 35 by means of a ball bearing mount 48, and thus when it is engaged by the shoes 38 and 39 it begins to rotate with them and the carrier plate 34. If the load driven from the drum 40 is relatively light, as when the agitator 14 is being driven, then the shoes 38 and 39 will lock together the plate 34 and the drum 40 substantially immediately. If, however, the load to be driven is a relatively heavy one, as when the spin basket 2 is to be accelerated from a dead stop with a full load of water, then slippage occurs between the clutch shoes and the drum. In other words, the drum 40 will not be immediately rotated at the speed of the shaft 35 but rather will gradually pick up speed. This gradual acceleration provided by the slippage between the clutch shoes and the drum 40 limits the torque required by the motor 20, thereby preventing the motor from being overloaded as it accelerates the spin basket. It is contemplated that, within the context of my invention, shaft 35, carrier plate 34, and drum 40 together constitute a driving member or means for the other clutch parts to be described herebelow in connection with this first embodiment of my invention.

The output pulley 22, from which power is passed through belt 23 to the transmission 25 (FIGURE 1), forms a part of an output drum member 49. As best shown by FIGURE 3, the output drum 49 carries a pair of speed responsive or centrifugally operated shoes 50 and 51. Specifically, the shoes 50 and 51 are formed as curved members positioned between drum 49 and drum 40, and they include respectively outwardly extending tabs 52 and 53 which fit into slots 54 and 55 respectively formed in the wall of the outer drum 49. Engagement between tabs 52 and 53 and their respective slots serves not only to mount the shoes 50 and 51 on the output drum but also to provide a positive driving connection whereby the shoes may drive the output drum. The fit between the tabs and the mounting slots 54 and 55 is, however, loose enough that shoe 50 and 51 may slide inwardly or outwardly with regard to the output drum.

It will be noted that the two shoes each include a friction surface on their inner side, shoe 50 having a friction surface 56 and shoe 51 having a friction surface 57, and that the shoes are normally biased by means of tension springs 58 and 59 connected between them so that these friction surfaces engage drum 40. In other words, when the inner drum 40 is at rest it is contacted by the clutch shoes 50 and 51 so that as the inner drum begins to pick up speed, the outer drum 49 is driven from it through the clutch shoes 50 and 51.

As the output drum 49 accelerates, the centrifugal force created by its rotation begins to reduce the pressure with which the clutch shoes 50 and 51 engage the inner drum 40. The higher the speed of the output drum 49 becomes, the smaller is the pressure between the clutch shoes and the inner drum 40, and the smaller the torque which they can transmit to the outer drum. The shoes, in fact, begin to slip with regard to drum 40. When a certain speed of the output drum is reached the slippage between the shoes 50 and 51 and drum 40 becomes such that the shoes are ineffective to increase the speed of the output drum 49 and its connected load any further. In other words, they can supply the torque necessary to keep the output drum rotating at the same speed but they cannot supply any additional torque to increase the speed of the output drum any further. The output drum and its load thus stop accelerating and begin to rotate steadily at that particular speed.

This point, where the clutch shoes 50 and 51 slip sufficiently with regard to the drum 40 that they stop accelerating the output drum 49, occurs at a speed well below the input shaft speed, and specifically occurs at the predetermined reduced speed of the output drum 49 which is desired to be transmitted to the pulley 22 for the delicate operations of agitator 14 and basket 2. The speed of the output drum 49 at which the shoes 50 and 51 slip relative to the input drum 40 may be controlled by proper selection of the springs 58 and 59 as compared with the design of the clutch shoes. For example, in one typical structure which may be provided, a 1750 r.p.m. drive motor 20 is provided, and the shoes 50 and 51 stop accelerating output drum 49 and begin to drive with a steady speed when the output drum reaches a speed of about 910 r.p.m. Thus, for that particular case, a reduced speed drive of about 52 percent of the speed of the normal or high speed drive is provided.

In summary, again reviewing the structure described thus far, it can be seen that a drum 40 which forms part of the driving means transmits force through shoes 50 and 51 to a drum 49 which forms part of the driven means. The two drums rotate together from a standstill until a speed below that at which the motor 20 rotates drum 40, and then due to the slippage caused by the outward movement of shoes 50 and 51, the drum 49 rotates at an intermediate speed. This intermediate speed provides the delicate washing action previously mentioned.

It is, of course, important that the operator of the washing machine 1 of FIGURE 1 be able to select regular washing and spin speeds as well as the slower action for more delicate articles of clothing. In this connection, I provide by my invention an appropriate structure on the drum 40 which cooperates with the drum 49 in order to positively couple the drums when desired and to preclude engagement of the two drums except by shoes 50 and 51 when slow speed is desired. At its bottom edge, as viewed in FIGURE 2, the drum 49 is provided with a number of spaced slots 60. As can readily be seen in FIGURE 4, the slots 60 preferably extend entirely around the periphery of drum 49.

The drum 40 includes a lower annular flange 61 having a pair of pins 62 and 63 extending upwardly therefrom. An annular member 64 is provided with slots 65 and 66 and is positioned on the flange 61 in sliding relation thereto, so that the two pins 62 and 63 extend through slots 65 and 66 respectively. With this arrangement, and with the annular inner opening 67 provided in the flat member 64, the member 64 may slide from one position to another on the flange 61.

Member 64 is provided with a pair of upstanding lugs 68 which are engaged by the ends 69 of a spring member 70 secured on pin 62 so as to exert on the entire member 64 a biasing force to the right as viewed in FIGURE 4. The member 64 is formed with a greater amount of mass on the left side thereof, as viewed in FIGURE 4, than on the right side. Therefore, when drum 40 rotates at high speed carrying with it the member 64, a substantially greater amount of centrifugal force is exerted on member 64 toward the left than toward the right. As a result, the member 64 moves in the direction of the greater mass. This greater mass includes a projection 71 which, when it is properly aligned with one of the slots 60, may move into the slot thereby effectively coupling the two drums 40 and 49 together for rotation at the same speed regardless of what happens to shoes 50 and 51.

The design of member 64 and of spring 70 is such that this movement occurs at a speed either below or substantially equal to the speed at which relative motion between the two drum members starts. I this connection it will be recalled that, where an input speed of 1750 was provided to shaft 35, a speed of 910 r.p.m. had been found to be effective for the particular machine shown in FIGURE 1. Since the movement of member 64 occurs before there is any substantial amount of relative motion between the drums 40 and 49, it does not matter whether the projection 71 is aligned with one of the slots 60: if the projection 71 is not aligned with a slot, it will move out against the inner surface of drum 49, and then, as soon as motion starts between the two drums, the projection 71 will slip into one of the slots 69 in response to the centrifugal force acting thereon.

Summarizing the invention as described thus far, centrifugally responsive member 64 takes over from the shoes 50 and 51 prior to the point at which they start to slip and thereby causes the speed of the drums to remain the same. That is, the driving drum 40, if rotated at 1750 r.p.m. will cause the driven drum 49 to rotate at the same speed.

As part of my inventive concept I provide novel locking means for permitting or preventing the movement of member 64 which causes positive coupling of the drums 40 and 49. The structure includes a detent member 72 pivotally mounted on a pin 73. As best shown in FIGURE 5, the opening 74 provided in member 72 for the pin 73 extending upwardly from member 64 is substantially larger than the pin. Thus, in addition to the pivoting motion in the plane shown in FIGURE 4, i.e., radially relative to shaft 35, some limited degree of movement of detent 72 may take place in the plane shown in FIGURE 5, i.e., axially relative to shaft 35.

A spring 75 is provided coiled about the pin 73, the spring being secured at one end to portion 76 of member 72 and at its other end to upwardly extending lug 77 on member 64. The spring 75 acts in a direction to bias the member 72 to a first position which is (1) inwardly toward shaft 35, as viewed in FIGURE 4, and (2) axially downwardly as viewed in FIGURE 5. The spring 75 is preferably relatively weak so that when the drum 40 starts to rotate, carrying with it member 64, the member 72 tends to fly outwardly, that is, to pivot in a counterclockwise direction (FIGURE 4) against the action of the spring, at a substantially lower speed than that at which the centrifugally caused movement of member 64 occurs. However, this movement of detent 72, with the structure thus far described, is substantially prevented because a surface 78 of member 72 engages a surface 79 formed at the inner edge of member 64 thereby preventing any further outward swing of member 72. This condition of the member 72 is clearly shown in FIGURES 6 and 7 in which the structure is shown at a speed where the apparatus is rotating at a speed high enough to cause movement of member 72 without yet having caused the movement of member 64.

The drum flange 61 is providing with an upwardly extending lug 80, for a purpose which will be more fully apparent herebelow. Because of the fact that outward radial movement of member 72 is stopped by surface 79 of member 64, then in response to centrifugal force acting on member 64 the front portion 81 of member 72 passes by lug 80 without interference, and the movement to the left, as viewed in FIGURES 4 and 6, of member 64 proceeds. In other words, there is no cooperative action between lug 80 and part 81 of member 72, and as a result, when the speed is reached at which member 64 normally moves to the left, it will do so and will provide a positive coupling between the drums 40 and 49 as described.

Referring now particularly to FIGURE 5 in conjunction with FIGURE 2, the lower part of member 72 forms a support for a pin 82 on which a follower member 83 is pivotally secured, being biased to the position shown by a spring 84. As best shown in FIGURE 2, the spring 84 biases the follower member 83 to a first position radially inwardly toward the shaft 35. The radially inward movement of follower member 83 is limited to the substantially vertical position shown in FIGURE 2; this is effected by forming the top of follower member 83 substantially flat so that when it reaches the vertical position the flat top thereof comes into abutment with the bottom of member 72 (as may be seen in FIGURE 5) and thereby stops the radially inward movement. Member 83 is engageable by a camming member 85 which may, as shown, be in the form of a flat annulus, with its surface substantially perpendicular to the axis of rotation, mounted on legs 86 which are secured on a support member 87. The support member 87 may in turn be secured on the housing of the motor 20.

A spring 88 biases the member 85 to the position shown; in order to overcome the action of spring 88, a solenoid member 89 is provided having a plunger 90 connected by a spring 91 to the opposite end of member 85 from spring 88. When the coil 92 of solenoid 89 is energized, the plunger 90 is pulled to the left, as viewed in FIGURE 2, and the travel of the plunger is such as to cause the member 85 to be pulled until the legs 86 extend substantially vertically upward. This causes an axial movement of the member 85 upwardly as viewed in FIGURE 2, and this upward movement makes member 85 engage the follower member 83 and push it upwardly. The upward push on member 83 causes the member 83 to be raised and to carry with it to a second axial position the member 72 which is free to be moved upwardly as previously described. It will, incidentally, be understood that spring 84 is sufficiently strong to prevent the upward movement of camming member 85 from pivoting follower member 83 rather than pushing it upwardly. This is readily achieved because of the substantially vertical position of follower member 83 when it is in a position to be engaged by member 85.

Referring now to FIGURES 7 and 8 it will be recalled that when member 72 tended to move outwardly as described before, the surface 78 thereof engaged surface 79 of member 64 to prevent further movement thereof. However, when the cam 85 engages the follower member 83 it raises the assembly of the follower member 83 and detent 72 to the second axial position shown in dotted outline in FIGURE 5. In this position, the member 72 has been raised above the level of member 64 so that, upon an outward pivoting motion of member 72 under the action of centrifugal force, surface 78 no longer engages surface 79. Instead, the outward swinging of member 72 is permitted to continue in response to centrifugal force until, in a second radial position of member 72, surface 93 (FIGURES 4 and 5) thereof engages the lug 80.

Engagement of surface 93 with the lug 80 causes the member 64 to be locked against any movement to the left as viewed in FIGURE 4, because of the fact that the surface 94 (FIGURES 4 and 6) of member 72 engages the edge of lug 80 and any substantial amount of movement of the member 64 on flange 61 is thereby prevented. As a result, when the detent member 72 has been raised to the position shown in dotted outline in FIGURE 5 prior to speed-responsive movement of member 64, a positive locking action is provided to prevent any movement of member 64. Without any movement of member 64, the projection 71 cannot enter one of the slots 69 and then the only coupling between drums 40 and 49 is that provided by the shoes 50 and 51.

In summary then, the low speed drive is provided when solenoid coil 92 is energized to raise cam member 85 and thereby raise the detent 72 to the position shown in dotted outline in FIGURE 5, and a high speed operation is provided when the solenoid is allowed to remain de-energized so that when detent member 72 swings outwardly surface 78 engages surface 79 to prevent the member from swinging outwardly enough to provide the aforementioned locking action.

Viewing FIGURE 2 it will readily be seen that as the rotational speed of the drum 40 increases, a centrifugal force will be exerted on follower member 83 to cause it to pivot in a clockwise direction against the action of spring 84. This action of the follower member 83 causes it to be moved under the action of centrifugal force to a second position where, at a predetermined speed, and regardless of the position of member 72, it is no longer engageable by camming member 85. This is a desirable feature since it prevents high speed engagement of camming member 85 and follower member 83 in the event solenoid coil 92 is energized during high speed rotation of the clutch parts.

It will be seen that the coupling of the shoes 50 and 51 alone provides the low speed rotation of the output drum of the clutch and that the coupling of the projection 71 within a slot 60 provides high speed rotation of the clutch. It will further be seen that one or the other may be selected by the construction shown when either no rotation or very low speed rotation is being provided. In addition, the construction precludes operation of the moving parts of the speed selecting mechanism during high speed rotation. In this manner, an effective construction is provided for achieving two output speeds from the clutch of FIGURES 2 through 8.

Referring now to FIGURES 9 to 12 of the drawings, there is described a second embodiment of my invention wherein it is shown as applied to a single speed clutch which permits a motor 100 having a shaft 101 either to transmit its full output speed to a drum 102 bearing a pulley 103 or else to be able to rotate without transmitting any of that rotation to the output drum 102.

An inner member 104 is rigidly secured to the shaft 101 by any suitable means such as a key 105. Member 104 supports a pair of clutch shoes 106 and 107 respectively provided on their outer peripheries with linings of frictional material 108 and 109. The shoes are respectively movably mounted relative to member 104 by means of rods 110 and 111 which extend through openings in the member 104, very light springs 112 and 113 being provided to bias the members 106 and 107 radially inwardly away from the drum 102.

It can be seen that, in the position to which they are biased by springs 112 and 113, members 106 and 107 are out of engagement with the drum 102 and that therefore the drum is not driven by shaft 101. However, when centrifugal force overcomes the force of the springs 112 and 113, the members 106 and 107 move outwardly so that their frictional linings 108 and 109 respectively engage the member 102 to couple the shaft 101 to the drum 102 and thereby transmit the rotation of the shaft to a belt 114 which passes over the pulley 103. Because the springs 112 and 113 are very light, it is contemplated that the shoes will move outwardly at a very low rotational speed which may, for instance, be on the order of 2 to twenty r.p.m., it being assumed for purposes of illustration that motor 100 is the same type as described in connection with the previous embodiment wherein an output speed on the order of 1750 r.p.m. is provided.

Secured to member 104 on opposite sides of shaft 101 are a pair of pins 115 and 116 which respectively support identical detent devices 117 and 118 in pivotable relationship to the member 104. Springs 119 and 120 bias the locking members 117 and 118 downwardly to the position shown in FIGURE 9. When the rotation of shaft 101 reaches a predetermined speed, the force of springs 119 and 120 is overcome by centrifugal force and the members 117 and 118 pivot upwardly and radially outwardly to the position shown in FIGURES 11 and 12. It will be understood in this connection that, for reasons to be more fully explained herebelow, the rotational speed at which the springs 119 and 120 are overcome by centrifugal force is substantially higher than that at which shoes 106 and 107 move to their outer positions.

Pivotably mounted on members 117 and 118 respectively by means of pins 121 and 122 are a pair of follower members 123 and 124 which are biased by springs 125 and 126 to the downward position shown in FIGURE 9. Where appropriate, stops 127 and 128 may be provided to insure the proper positioning of follower members 123 and 124. Arranged to move upwardly into engagement with the follower members 123 and 124 is an annular camming member 130 arranged to be movably mounted on a support 131 secured on the housing of motor 100. The movable relationship of camming member 130 to its support 131 and to members 123 and 124 may be achieved, as before, by the use of leg members 132 which are biased by a spring 133 so that the camming member normally assumes the position shown. One end of the camming member is secured by spring 134 to the plunger 135 of a solenoid 136 having a coil 137 and which is also mounted on the support 131.

When the solenoid coil 137 is energized, it pulls in plunger 135 and, through spring 134, the member 130 is pulled to the left as viewed in FIGURE 9 thereby causing it to rise up and engage the follower members 123 and 124. This action has the effect of pushing the locking assemblies, which in the one case includes detent 117 and member 123 and in the other case includes detent 118 and member 124, upwardly to the position shown in FIGURES 11 and 12.

It will be seen from FIGURE 11 that when this operation is performed with the shaft 101 at a standstill, that is, when the solenoid coil 137 is energized before motor 100 is started, a locking projection 138 of detent 117 enters a recess 139 formed in shoe 106 so as to lock the shoe in the inward position where it does not couple the shaft 101 to drum 102; detent 118 has a similar relationship to shoe 107. Consequently, energization of the solenoid coil 137, when it occurs before the motor 100 starts to rotate shaft 101, locks the shoes 106 and 107 so that they will not engage drum 102, and a neutral is effectively provided in which the motor 100 operates but the output pulley 103 does not turn.

It will be observed from FIGURE 12, and understood from the foregoing description, that even where the camming member 130 has not moved the follower members upwardly, the detent 117 will pivot about pin 115 when the speed is reached at which centrifugal force overcomes the spring 119. However, as previously stated, this speed is substantially higher than that at which the coupling shoes move outwardly; accordingly, when there is no initial camming action provided the shoes will already be out of the way as shown in FIGURE 12, and an effective coupling will have been secured between shaft 101 and drum 102. As a result of the sequence in which the centrifugally responsive parts move, energization of the solenoid 137 causes operation of the detent members in time to prevent shoes 106 and 107 from coupling the shaft 101 to drum 102, while, if the solenoid coil is not energized, the motion of the detent occurs too late to prevent the coupling action from occurring.

In order to prevent high speed engagement between the camming means and the follower, the follower means 123 and 124 and their springs 125 and 126 are so designed that, at a speed which is higher than that at which the detents 117 and 118 are moved by centrifugal force, the follower members pivot outwardly under the action of centrifugal force to the position shown in dotted outline in FIGURE 12 for member 123. In this position, there is no engagement between the follower member 123 and the cam member 130. Thus, by this third centrifugally responsive structure, high speed engagement of parts is prevented, it being understood that such high speed engagement could either damage the parts or cause them to wear out more rapidly than is desirable. It will be understood of course that this motion of the follower members must necessarily occur at a speed which is higher than that at which the other centrifugally responsive motions take place, since it is important that the position of the detent members have been determined by the time the camming member becomes ineffective to engage the members 123 and 124.

It will thus be seen from this second embodiment that I have provided a structure wherein the sequential operation of centrifugally movable members is utilized in cooperation with an actuating cam to provide engagement or prevent engagement of driving and driven members.

In summary, it will be seen that my improved clutch either provides for or prevents rotation of the driven member by a driving member, and that this action is effected by a highly economical structure as a result of a particular relationship of members responsive to centrifugal force created by the speed of rotation.

Thus, while in accordance with the patent statutes I have described what at present are considered to be the preferred embodiments of my invention, it will be obvious to those skilled in the art that various changes and modifications may be made therein without departing from the invention, and I therefore aim in the appended claims to cover all such changes and modifications as fall within the true spirit and scope of my invention.

What I claim as new and desire to secure by Letters Patent of the United States is:

1. A clutch comprising: co-axial rotatable driving and driven means; said driving means including speed responsive means movable in response to centrifugal force at a predetermined speed from an inoperative position to an operative position in which it connects said driving means to said driven means; said driving means further including a locking assembly comprising a detent biased to a first position and movable to a second position in which it prevents movement of said speed responsive means to its operative position, said locking assembly further comprising a follower member secured to said detent; and camming means movable into engagement with said follower member, said follower member and said detent being arranged so that said detent is moved to its second position upon engagement of said follower member by said camming means and is kept in said second position by centrifugal force during rotation of said driving means.

2. A clutch comprising: co-axial rotatable driving and driven means; said driving means including speed responsive means movable in response to centrifugal force at a predetermined speed from an inoperative position to an operative position in which it connects said driving means to said driven means; said driving means further including a locking assembly comprising a detent biased to a first position and movable to a second position in which it prevents movement of said speed responsive means to its operative position, said locking assembly further comprising a follower member secured to said detent, said follower member being biased to a first position relative to said detent and moving to a second position relative to said detent at a predetermined speed; camming means movable into engagement with said follower member only when said follower member is in its first position relative to said detent, said follower member and said detent being arranged so that said detent is moved to its second position upon engagement of said follower member by said camming means and so that said detent is kept in said second position by centrifugal force upon rotation of said driving means after said follower member moves to its second position.

3. A clutch comprising: co-axial rotatable driving and driven means; said driven means including a substantially annular inner surface; said driving means including at least one speed responsive member having an outer arcuate surface positioned within said annular driven surface and means biasing said speed responive member to a radially inner poition, said speed responsive member being movable outwardly in response to centrifugal force at a predetermined speed so that its arcuate outer surface engages said annular driven surface thereby to couple said driving means to said driven means; said driving means further including a locking assembly comprising a detent biased to a first position and movable to a second position in which it prevents movement of said speed responsive member to its outer position, said locking assembly further comprising a follower member secured to said detent, said follower member being biased to a first position relative to said detent and moving to a second position relative to said detent at a predetermined speed; camming means movable into engagement with said follower member only when said follower member is in its first position relative to said detent, said follower member and said detent being arranged so that said detent is moved to its second position upon engagement of said follower member by said camming means and so that said detent is kept in said second position by centrifugal force upon rotation of said driving means when said follower member moves to its second position.

4. A clutch comprising: co-axial rotatable driving and driven means; said driven means including a drum having an annular portion with at least one slot formed therein; said driving means including a speed responsive member positioned radially inwardly of said driven means annular member and being movable outwardly in response to centrifugal force at a predetermined speed to a position where it extends through said slot thereby to couple said driving means to said driven means; said driving means further including a locking assembly comprising a detent biased to a first position and movable to a second position in which it prevents movement of said speed responsive member to its outer position, said locking assembly further comprising a follower member secured to said detent, said follower member being biased to a first position relative to said detent and moving to a second position relative to said detent at a predetermined speed; camming means movable into engagement with said follower member only wen said follower member is in its first position relative to said detent, said follower member and said detent being arranged so that said detent is moved to its second position upon engagement of said follower member by said camming means and so that said detent is kept in said second position by centrifugal force upon rotation of said driving means subsequent after said follower member moves to its second position.

5. The apparatus defined in claim 2 wherein said follower member is pivotally secured adjacent one end to said detent and extends in a generally axial direction relative to the axis of rotation of said driving and driven means, said detent being pivotally mounted and being movable axialy and radially into locking position.

6. A clutch comprising: co-axial rotatable driving and driven means; said driving means including speed responsive means movable in response to centrifugal force at a predetermined speed from an inoperative position to an operative position in which it couples said driving means to said driven means; said driving means further including a locking assembly comprising a detent biased to first axial and radial positions, said detent being movable to a second axial position and to a second radial position by centrifugal force when in said second axial position, said detent being arranged to move to said second radial position before said speed responsive means moves to its operative position and being arranged to prevent movement of said speed responsive means to its operative position when in said second radial position, said locking assembly further comprising a follower member secured to said detent, said follower member being biased to a first position relative to said detent and moving to a second position relative to said detent at a predetermined speed; camming means movable into engagement with said follower member only when said follower member is in its first position relative to said detent, said follower member and said detent being arranged so that said detent is moved to its second axial position upon engagement of said follower member by said camming means and so that once moved to said second axial position said detent is kept therein by centrifugal force upon rotation of said driving means after said follower member moves to its second position.

7. A clutch comprising: co-axial rotatable driving and driven means; said driving means including speed responsive means movable in response to centrifugal force at a predetermined speed from an inoperative position to an operative position in which it couples said driving means to said driven means; said driving means further including a locking assembly comprising a pin extending axially from said speed responsive means and a detent loosely secured on said pin to pivot therearound in radial and axial directions, said detent being biased to a radially inward first position and to a first axial position and being movable to an outer second radial position and a second axial position, means for preventing radially outward pivoting movement of said detent when said detent is in its first axial position, said detent being axially removed from said preventing means when in its second axial position and thus being movable to said second radial position by centrifugal force, said detent preventing movement of said speed responsive means to its operative position in its second radial position, said locking assembly further comprising a follower member secured to said detent and extending axially therefrom, said follower member being biased to a first radial position relative to said detent and pivoting outwardly to a second position relative to said detent at a predetermined speed; camming means movable into engagement with said follower member only when said follower member is in its first position relative to said detent, said follower member and said detent being secured to each other so that said detent is moved to its second axial position upon engagement of said follower member by said camming means, said preventing means preventing said detent from returning to its first axial position as long as said detent is kept in its second radial position by centrifugal force, said detent being arranged to move to its second radial position before said speed responsive means moves to its operative position and to be kept in its second radial position by centrifugal force upon rotating of said driving means after said follower member moves to its second position.

8. The apparatus defined in claim 1 wherein said camming means comprises an annular ring having a substantially flat surface perpendicular to the axis of rotation of said driving and driven means, and means for moving said annular ring axially into and out of a position where said camming means may engage said follower member when said follower member is in its first position.

9. The apparatus defined in claim 1 wherein centrifugally operable means are provided for connecting said driving and driven means up to a predetermined intermediate speed substantially below that at which said driving means may be operated, whereby said driven means is operated at said intermediate speed when said speed responsive means is kept in its inoperative position and is driven at the same speed as said driving means when said speed responsive means is in its operative position.

10. The apparatus defined in claim 6 wherein additional speed responsive means are provided for connecting said driving and driven means up to a predetermined intermediate speed below the speed at which said driving means is operated.

11. A clutch comprising: co-axial rotatable driving and driven means; said driving means including speed responsive means movable in response to centrifugal force at a predetermined relatively low speed from an inoperative position to an operative position in which it connects said driving means to said driven means; said driving means further including a locking assembly comprising a detent biased to a first position and movable to a second position in which it prevents movement of said speed responsive means to its operative position when said speed responsive means is in its inoperative position, said detent being movable to said second position in response to centrifugal force at a second higher predetermined speed, said locking assembly further comprising a follower member secured to said detent, said follower member being biased to a first position relative to said detent and moving to a second position relative to said detent at a third higher predetermined speed; camming means movable into engagement with said follower member only when said follower member is in its first position relative to said detent, said follower member and said detent being arranged so that said detent is moved to its second position upon engagement of said follower member by said camming means.

12. A clutch comprising: co-axial rotatable driving and driven means; said driving means including speed responsive means movable in response to centrifugal force at a predetermined relatively low speed from an inoperative position to an operative position in which it connects said driving means to said driven means; said driving means further including a locking assembly comprising a detent biased to a first position and movable to a second position in which it prevents movement of said speed responsive means to its operative position when said speed responsive means is in its inoperative position, said detent being movable to said second position in response to centrifugal force at a second higher predetermined speed, said locking assembly further comprising a follower member secured to said detent; camming means movable into engagement with said follower member, said follower member and said detent being arranged so that said detent is moved to its second position upon engagement of said follower member by said camming means.

13. A clutch comprising: co-axial rotatable driving and driven means; said driving means including speed responsive means movable in response to centrifugal force at a predetermined speed from an inoperative position to an operative position in which it couples said driving means to said driving means; said driving means further including a locking assembly comprising a detent biased to first axial and radial positions, said detent being movable to a second axial position and to a second radial position by centrifugal force when in said second axial position, said detent being arranged to move to said second radial position before said speed responsive means moves to its operative position and being arranged to prevent movement of said speed responsive means to its operative positin when in said second radial position, said locking assembly further comprsing a follower member secured to said detent; camming means movable into engagement with said follower member, said follower member and said detent being arranged so that said detent is moved to its second axial position upon engagement of said follower member by said camming means and so that once moved to said second axial position said detent is kept therein by centrifugal force upon rotation of said driving means.

References Cited in the file of this patent

UNITED STATES PATENTS

| | | |
|---|---|---|
| 1,511,776 | Roberts | Oct. 14, 1924 |
| 1,764,317 | Kruse | June 17, 1930 |
| 2,018,101 | Swennes et al. | Oct. 22, 1935 |
| 2,387,050 | Bell | Oct. 16, 1945 |
| 2,809,535 | Hein et al. | Oct. 15, 1957 |
| 2,869,698 | Conlee | Jan. 20, 1959 |
| 2,869,699 | Bochan | Jan. 20, 1959 |